(12) United States Patent
Mitchell et al.

(10) Patent No.: US 9,109,192 B1
(45) Date of Patent: Aug. 18, 2015

(54) AUTOMATED BEER BREWING SYSTEM WITH VESSEL FOR BREWING AND FERMENTING

(71) Applicant: PicoBrew, LLC, Seattle, WA (US)

(72) Inventors: William H. Mitchell, Medina, WA (US); James B. Mitchell, Seattle, WA (US); Avi R. Geiger, Seattle, WA (US)

(73) Assignee: PicoBrew, Inc., Seattle, WA (US)

( * ) Notice: Subject to any disclaimer, the term of this patent is extended or adjusted under 35 U.S.C. 154(b) by 0 days.

(21) Appl. No.: 14/658,100

(22) Filed: Mar. 13, 2015

Related U.S. Application Data

(63) Continuation of application No. 14/485,655, filed on Sep. 12, 2014, which is a continuation-in-part of application No. 13/323,537, filed on Dec. 12, 2011.

(60) Provisional application No. 61/449,023, filed on Mar. 3, 2011.

(51) Int. Cl.
*C12C 11/00* (2006.01)

(52) U.S. Cl.
CPC .................... *C12C 11/006* (2013.01)

(58) Field of Classification Search
CPC ........ C12C 1/02; C12C 11/006; C12C 7/205; C12C 7/06
USPC ................... 99/275, 276, 278, 281, 326, 334; 426/16, 330, 425
See application file for complete search history.

(56) References Cited

U.S. PATENT DOCUMENTS

| | | | |
|---|---|---|---|
| 941,009 A * | 11/1909 | Cauchois ........................ 99/308 |
| 2,547,481 A * | 4/1951 | McDonald ................... 137/263 |
| 2,761,200 A * | 9/1956 | Arnett ............................. 99/283 |
| 2,830,528 A * | 4/1958 | Arnett ............................. 99/283 |
| 3,563,157 A | 2/1971 | Lenz |
| 4,503,502 A * | 3/1985 | Chapin ........................... 700/90 |
| 4,557,186 A * | 12/1985 | Brown ............................ 99/278 |
| 4,751,875 A * | 6/1988 | Wooten, Jr. ..................... 99/308 |
| 4,754,696 A | 7/1988 | Sarazen et al. |
| 4,754,698 A * | 7/1988 | Naish .............................. 99/275 |
| 4,790,239 A * | 12/1988 | Hewitt ............................ 99/279 |
| 5,158,793 A * | 10/1992 | Helbling ....................... 426/231 |
| 5,265,518 A * | 11/1993 | Reese et al. .................... 99/280 |
| 5,311,811 A | 5/1994 | Kuzyk |
| 5,970,846 A * | 10/1999 | Roehr ............................. 99/276 |
| 6,032,571 A | 3/2000 | Brous et al. |
| 6,629,490 B1* | 10/2003 | Lu et al. ......................... 99/276 |
| 7,963,213 B1 | 6/2011 | Murdock |
| 8,993,273 B1 | 3/2015 | Blichmann |
| 2001/0035097 A1* | 11/2001 | Shaanan et al. ................ 99/280 |
| 2003/0019031 A1 | 1/2003 | Mosis |
| 2005/0011364 A1* | 1/2005 | Chen et al. ..................... 99/275 |
| 2009/0229471 A1* | 9/2009 | Lun et al. ....................... 99/300 |
| 2010/0236949 A1 | 9/2010 | Vacca et al. |
| 2014/0017354 A1* | 1/2014 | Joseph et al. .................. 426/16 |
| 2015/0000530 A1 | 1/2015 | Mitchell et al. |
| 2015/0000531 A1 | 1/2015 | Mitchell et al. |
| 2015/0000532 A1 | 1/2015 | Mitchell et al. |

* cited by examiner

*Primary Examiner* — Thien S Tran
(74) *Attorney, Agent, or Firm* — Russell S. Krajec; Krajec Patent Offices, LLC

(57) ABSTRACT

A beer making system may use a detachable vessel to contain liquid during the mashing and boiling steps, and may also be used during the fermentation steps of beer making. The beer making system may recirculate liquid through the vessel, then select between several flow paths during the beer making process. A removable reservoir system having a grain reservoir and several hops or adjunct reservoirs may be selected as a flow path, as well as a bypass flow path. A programmable controller may cause liquid to recirculate through a heater and one of the various flow paths, the sequence, timing, and temperature profile of which are defined in a recipe for a particular beer.

15 Claims, 11 Drawing Sheets

AUTOMATED BEER BREWING SYSTEM WITH VESSEL FOR BREWING AND FERMENTING

CROSS REFERENCE TO RELATED APPLICATIONS

This application claims priority to and benefit of U.S. patent application Ser. No. 13/323,537 entitled "Automated Beer Brewing System with Vessel for Brewing and Fermenting" filed 12 Sep. 2014, which claims priority to U.S. patent application Ser. No. 13/323,537 entitled "Simple, Efficient, Automated All-Grain Beer Brewing System" filed 12 Dec. 2011, which claims priority to U.S. Provisional Patent Application Ser. No. 61/449,023 entitled "Simple, Efficient, Automated All-Grain Beer Brewing System" filed 3 Mar. 2011, the entire contents of which are hereby expressly incorporated by reference for all they disclose and teach.

BACKGROUND

Beer making has been practiced for many years. Sugars are extracted from malted grains through a process called mashing. The sugars are boiled with hops, and the resultant wort is fermented with yeast. There are many styles of beers, each of which has is its particular character.

The sugars that are extracted from the malted grains can be changed by varying temperature and time of the extraction. The temperature and time profile may include raising and lowering the temperature, including holding the grain and liquid mash at a specific temperature for a defined period of time. The accuracy of the mashing process defines how repeatable a beer can be made from one batch to another.

SUMMARY

A beer making system may use a detachable vessel to contain liquid during the mashing and boiling steps, and may also be used during the fermentation steps of beer making. The beer making system may recirculate liquid through the vessel, then select between several flow paths during the beer making process. A removable reservoir system having a grain reservoir and several hops or adjunct reservoirs may be selected as a flow path, as well as a bypass flow path. A programmable controller may cause liquid to recirculate through a heater and one of the various flow paths, the sequence, timing, and temperature profile of which are defined in a recipe for a particular beer.

A beer making device may have removable reservoirs through which brewing ingredients may be added. The removable reservoir may include a grain steeping reservoir and one or more adjunct or hops steeping reservoirs. A removable tub may contain the various reservoirs, and some or all of the various ingredient reservoirs may be removable from the reservoir tub. For example, a set of hops reservoirs may be manufactured as a single joined unit, and may be removable from the reservoir tub. The removable reservoirs may include a check valve which may shut off flow when the reservoir may be removed or dislodged, thereby minimizing leakage, and a beer making device may further sense such a situation and cause operations to cease.

A cascading hops reservoir may have a series of hops or adjunct reservoirs, each having a drain and an overflow. The series of reservoirs may be used by causing flow through a first reservoir, which may cause liquid to flow through the reservoir and through the drain, as well as past an overflow. When a second set of hops or adjuncts may be added, the flow may be introduced to a second reservoir, which may flow through a drain and also overflow into the first reservoir. A series of multiple reservoirs may thus be used to introduce hops or other adjuncts into a brewing cycle in stages, with each additional stage including previous stages in the recirculating flow during the brewing cycle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 1 is not to scale.

FIG. 3A is not to scale.

FIG. 3B is not to scale.

FIG. 4 is not to scale.

FIG. 5 is not to scale.

DETAILED DESCRIPTION

Figure 1:
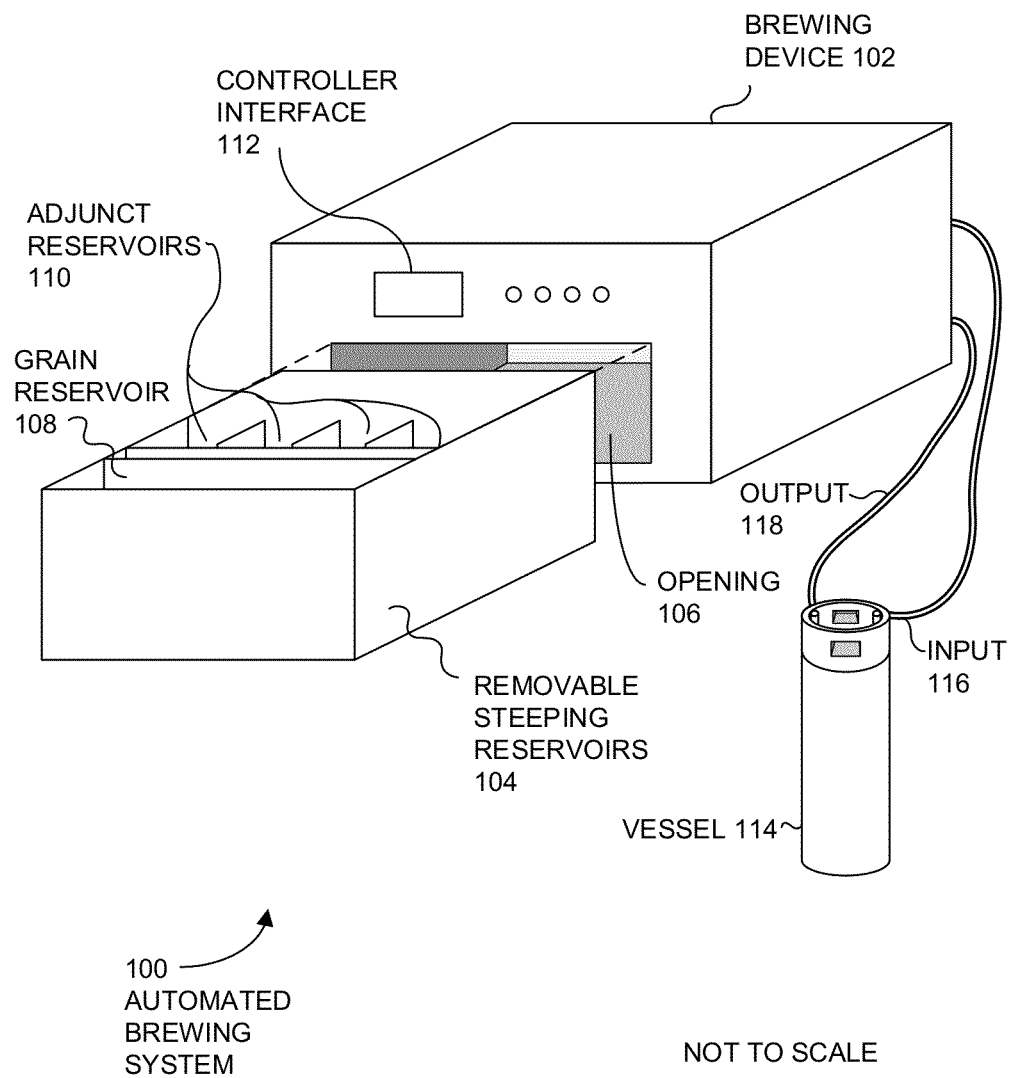
FIG. 1 is a diagram illustration of an embodiment showing an automated beer brewing system.

A beer brewing system may use a recirculating liquid path with a heating mechanism and a selectable flow path to manufacture beer wort. The system may extract sugars from malted grains in a mashing phase, perform a boil phase, and cool the wort prior to fermentation. The system may use a single vessel or sump to contain the liquid through some or all of the wort manufacture phases. In some cases, the vessel may also be used for fermentation.

The beer brewing system may have a recirculating flow path with a flow selecting system. The flow selecting system may cause the recirculating liquid to pass through several different reservoirs, each of the reservoirs may contain ingredients for the wort production, such as grains, hops, or other adjuncts. The combination of multiple reservoirs plus an automated flow section mechanism may allow a recirculating beer making system to utilize a single sump or vessel.

The sump or vessel may be used as a hot liquor tun as water is being heated, as a mash tun and lauter tun during mashing and sugar extraction, as a boiling vessel during a boil phase, and the same vessel may also be used a fermentation vessel. Because hot liquid may be passed through the vessel during recirculation, the vessel may be sterilized through the wort manufacturing process, and the use of a single vessel may reduce the cost and complexity of the overall system.

A flow selecting system may cause liquid to be recirculated through different reservoirs, each of which may contain a different ingredient for the wort. The flow selecting mechanism may be programmatically controlled, and such a system may automatically control the system to manufacture wort with limited or no user interaction.

A programmable controller may control the various components of the system, including monitoring the various temperatures, controlling recirculating pump or pumps, and selecting the flow paths. A recipe may be downloaded to the controller, and the recipe may include a brewing sequence that may define a sequence of flow paths, as well as time and temperature profiles for each portion of the sequence of flow paths.

The system may have a series of reservoirs that may contain ingredients for a particular beer recipe. Such ingredients typically include malted grains, such as malted barley, rice, wheat, corn, or other grains, as well as one or more adjunct reservoirs that may contain hops and other adjuncts such as honey or other flavorings.

The reservoirs may be removable from the beer making system. Removable reservoirs may make loading, unloading, and cleaning of the reservoirs convenient and easy. The reservoirs may be loaded ahead of time and even sold or distributed as a pre-loaded unit for brewing a particular style of beer.

The reservoirs may contain a collection area and a drain, which may collect liquid that may have passed through one or more of the reservoirs. The drain may be routed to return to a sump or vessel, sometimes with the aid of a return recirculating pump. In some cases, the collection area and drain may be part of a larger removable container which may house all of the removable reservoirs. In one such case, all of the reservoirs may be removed as a single unit.

The reservoirs may include a grain reservoir, which may include hold grains while the grains are steeped in the brewing liquid as it recirculates. The liquid may begin as water that is heated to an initial mash temperature, then recirculated through the grain reservoir. As the grains steep in the recirculating liquid, the sugars may be extracted. During mashing, the temperature may be held, raised, or lowered according to a predefined mash schedule.

The liquid level in the grain reservoir or any of the other reservoirs may be controlled using a number of different designs. In one design, a sensor may be able to detect the amount of liquid in the reservoir, and an inlet pump may be controlled to increase, decrease, start, or stop pumping to maintain such a level. In another design, a sensor may be used as an input to a pump attached to the output of the reservoir, and the output pump may be controlled to increase, decrease, start, or stop pumping to maintain such a level. In both such designs, a sensor may be used as part of a feedback loop to control the liquid level in a given reservoir.

In yet another design, a reservoir may have an outlet that may be mechanically sized and positioned such that an input pump may deliver a continuous flow of liquid which may fill the reservoir and the reservoir may maintain a liquid level above the grain.

In one version of such a system, the grain reservoir may have an overflow path, where the liquid level may be maintained over a grain bed. In such a version, the grain reservoir may have a set of drain holes that may be sized to flow less liquid than a recirculating pump may deliver to the reservoir. In such a system, a recirculating pump may maintain the reservoir in an overflow condition such that the grain may remain covered with liquid while the excess overflows and may be recirculated. A similar overflow design may be used for the hops or adjunct reservoirs.

The grain reservoir may be sized to hold all of the liquid that may be in the system at any time without overflowing. Such a system may be sized to prevent leaking or overflow if a return pump fails, a blockage occurs in a return line, or some other failure occurs.

A bypass flow path may allow liquid to be recirculated from a sump or vessel, through a heating or cooling element, and be returned to the vessel. A bypass flow path may be used to heat or cool the liquid without passing the liquid through one of the various reservoirs. In many situations, a bypass flow path may be used to change the temperature of the liquid prior to some step in the brewing process. For example, a heating cycle may be used to heat the liquid prior to beginning a mashing cycle, or prior to a boiling cycle.

The system may have a heating mechanism. The heating mechanism may add heat to the liquid while the liquid recirculates. A "direct heat" type of heating mechanism may be one in which a heating element is attached to a pipe through which the liquid recirculates or where the heating element is inserted into a pipe through which the liquid recirculates. The term "direct heat" is used to differentiate from an "indirect heat" mechanism, which is one in which a heating element heats a liquid heat exchange medium, and the heated liquid heat exchange medium may apply heat to the brewing liquid through a heat exchanger. In general terms, a "direct heat" type of heating mechanism may be one in which the liquid may be scorched by possibly overheating the liquid, whereas an indirect heating system may not have the possibility of scorching the liquid.

During a boil phase of wort manufacture, the flow may be passed through one or more adjunct or hops reservoirs. Several hops reservoirs may be used to introduce hops or other adjuncts into the boil phase at predetermined times.

The construction of adjunct or hops reservoirs may have a cascading mechanism whereby liquid may be permitted to flow from one adjunct reservoir to another adjunct reservoir. Such a construction may allow adjuncts to be introduced to the recirculating flow in sequence, with the first addition being kept in the recirculating flow as a second one is added, and so forth.

A vessel may serve as a sump during some or all of the phases of wort manufacture. The vessel may contain an initial charge of water, which may be recirculated through the various reservoirs, heating mechanisms, cooling mechanisms, or other components during the wort manufacturing. In such a system, the same vessel may be used for holding liquid during mashing, boiling, cooling, and even fermenting stages of brewing. In some cases, the same vessel may also be used for conditioning and dispensing beer after fermentation.

The vessel may be removable from a brewing system. Such a configuration may allow the vessel to be used for fermentation while a second vessel may be attached to the brewing system and another batch of beer started.

Some systems may have a cooling system. A cooling system may be used to lower the temperature of the liquid during various stages of the wort manufacture, such as the final cooling prior to beginning fermentation. In some cases, the cooling system may be employed to actively drop temperature during a mash step.

Some systems may have an active cooling system, where a heat exchanger may have liquid pass through one side while chilled liquid pass through a second side of the heat exchanger. Some such systems may use tap water as the chilled liquid, while other systems may have another type of chilled liquid generator. In some cases, the wort or liquid may pass through a heat exchanger that may be immersed in ice water or some other lower temperature medium.

Some systems may have a passive cooling system that does not contain a mechanism for removing heat. An example of a passive cooling system may recirculate liquid through a bypass flow path. The recirculation may cause the liquid or wort to cool faster than if the recirculation were not performed.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

FIG. 1 is a diagram illustration of an embodiment 100 showing an automated brewing system. Embodiment 100 is merely one example of a system that recirculates liquid through multiple selectable reservoirs and a heating mechanism to manufacture wort. A programmable controller may automate the heating system and flow path selection and may be able to automatically manufacture wort with little to no user interaction.

A brewing device 102 may have a set of removable steeping reservoirs 104 that may be inserted into an opening 106 in the device 102. The removable steeping reservoirs 104 may contain grains for mashing, as well as hops or other adjunct for use during a boiling phase.

The removable reservoirs 104 may be loaded with ingredients, then inserted into the brewing device 102. A vessel 114 may be pre-loaded with water at the beginning of the process, and the water may be recirculated through a heating mechanism in the brewing device 102, as well as through the various reservoirs.

The removable steeping reservoirs 104 may contain a grain reservoir 108, as well as multiple adjunct reservoirs 110. The grain reservoir 108 may be loaded with various cracked or ground grains such as malted barley, rice, corn, or other grains. The hops or adjunct reservoirs 110 may be loaded with hops or other adjuncts such as honey, flavored extracts, or other ingredients.

The vessel 114 may be connected to the brewing device 102 with an input 116 and output 118. A recirculating flow path may pull liquid from the vessel 114, pass the liquid through a heating mechanism, through one of the reservoirs or a bypass flow path, then return the liquid to the vessel 114.

A controller interface 112 may be a user interface containing input and output mechanisms for a user to interact with the brewing device 102. Examples of the input mechanisms may include buttons, switches, touchscreens, pointing devices, or other input mechanisms. An output mechanism may include lights, buzzers, display screens, or other output mechanisms.

In some embodiments, the brewing device 102 may be controlled by a remote device, such as a cellular telephone, tablet computer, desktop computer, or other device. In such an embodiment, the user may interact with the remote device to cause the brewing device 102 to perform various actions.

The brewing device 102 may have a network connection that may enable the brewing device 102 to be programmed from various sources. For example, a server may operate a website and a user may be able to select a recipe for execution by the brewing device 102. The recipe may be downloaded to the brewing device 102, and then a user may cause the brewing to begin by interacting with the controller interface 112.

Figure 2:
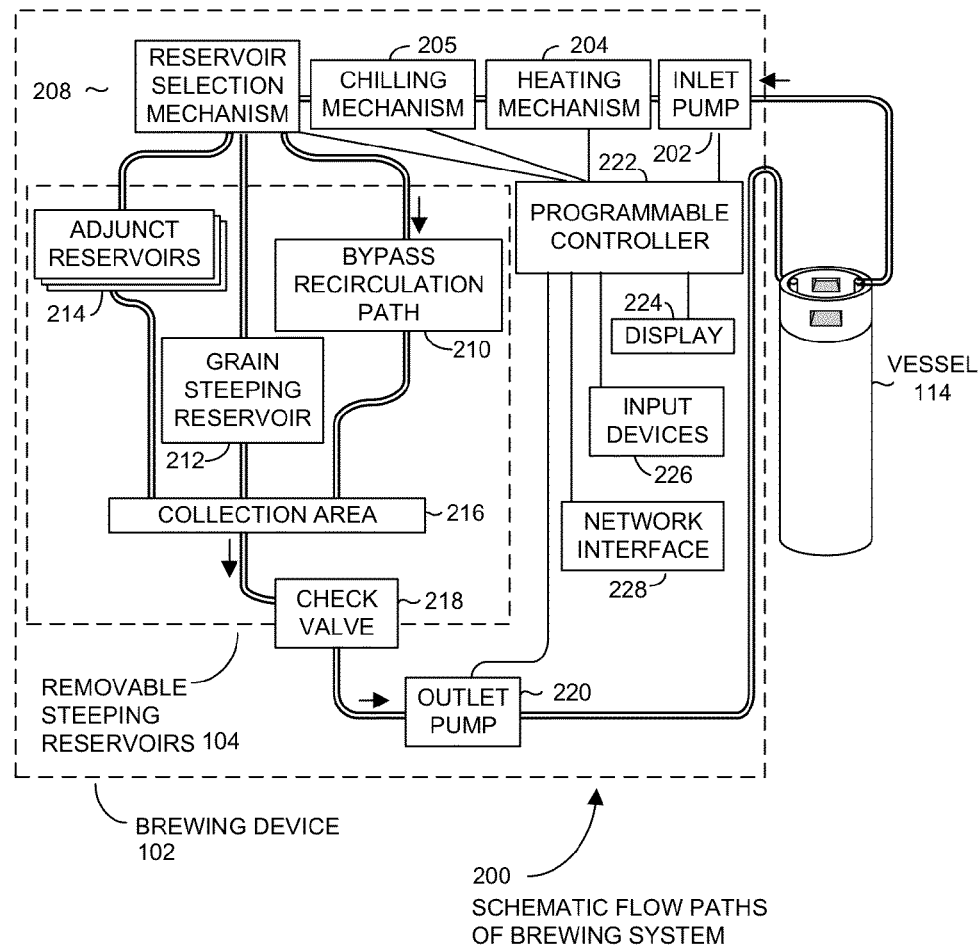
FIG. 2 is a diagram illustration of an embodiment showing a schematic or functional representation of an automated beer brewing system.

FIG. 2 illustrates an embodiment 200 showing a functional diagram of the brewing device 102 from embodiment 100. Embodiment 200 is merely one example of an automated brewing system, and other embodiments may have additional or fewer components, or may have the components arranged in a different manner.

The diagram of FIG. 2 illustrates functional components of a system. In some cases, the component may be a hardware component, a software component, or a combination of hardware and software. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 may illustrate the brewing device 102, removable steeping reservoirs 104, and vessel 114 as shown in embodiment 100.

The recirculating flow of liquid may be pulled from the vessel 114 through an inlet pump 202 and through a heating mechanism 204 and an optional chilling mechanism 205. The liquid may flow through a reservoir selection mechanism 208 and through one or more flow paths, which may consist of a bypass circulation path 210, a grain steeping reservoir 212, and one or more hops or adjunct reservoirs 214. The output of the various flow paths may pass through a collection area 216 and a check valve 218 before leaving the removable steeping reservoirs 104. An outlet pump 220 may draw liquid from the reservoirs 104 and back to the vessel 114.

A programmable controller 222 may control the inlet pump 202, outlet pump 220, as well as the heating mechanism 204, chilling mechanism 205, and the reservoir selection mechanism 208. The programmable controller 222 may have a display 224, input devices 226, and a network interface 228.

The reservoir selection mechanism 208 may direct the recirculating flow through one or more of the various reservoirs or the bypass flow path. The reservoir selection mechanism 208 may be implemented as a moving tube that may be positioned over one of the flow paths to select the flow path. The recirculating liquid may be dispensed into the flow path.

The reservoir selection mechanism 208 may be implemented in many different manners. In one design, a moving arm may be positioned over a selected reservoir using a stepper or servo motor. A sensor or sensors may be used to detect when the moving arm may be in one or more known positions, and a feedback loop may be used to control the position of the moving arm.

In another design, the flow output may be positioned over a selected reservoir using an X-Y stage. In one such design, an output tube may be positioned over a selected flow path using independently controlled X and Y actuators. Such a design may be useful to dispense liquid over a large reservoir by moving back and forth during recirculation, thereby spreading the recirculating liquid more evenly across a reservoir than when a dispensing tube is positioned in a single location. Other designs may also include a mechanism to move a dispensing tube over a reservoir during recirculation.

In still another design, the flow may pass through a manifold that may have outlets over each of the various reservoirs and individually controlled valves for each reservoir. In such a design, a programmable controller may select one or more reservoirs for flow, and select the corresponding valves to be open and other valves to be closed. Such a design may allow multiple flow paths to be open at any given time.

The output of the various reservoirs or bypass recirculation path may collect in a collection area 216. The collection area 216 may be a portion of the removable steeping reservoirs 104 where the outflow of the reservoirs may gather. A check valve 218 may be located at an exit to the reservoirs 104 so that any liquid in the reservoirs 104 may not spill when the reservoirs 104 are removed from the brewing device 102.

A safety mechanism may detect when the reservoirs 104 are removed or dislodged from the device 102. The detection may be made with a sensor, switch, or other mechanism by which the programmable controller 222 may detect that the reservoirs 104 are not positioned properly. When a detection is made that the reservoirs 104 are not positioned properly, the programmable controller 222 may shut down the inlet pump 202 to prevent further liquid from being dispensed from the reservoir selection mechanism 208 and, due to the incorrectly positioned reservoirs 104, may spill from the device 102.

The check valve 218 may be constructed to close when the reservoirs 104 are removed from the device 102 and may be open when the reservoirs 104 are fully seated in the device 102. In one such design, a check valve may be spring loaded to open when the reservoirs 104 are fully seated but remain closed when not fully seated.

The inlet pump 202 and outlet pump 220 may be controlled in different manners. In one manner, both the inlet pump 202 and outlet pump 220 may be controlled to be either on or off. In another manner, one or both of the pumps may be variable controlled, such that the programmable controller 222 may be able to increase or decrease the flow.

The outlet pump 220 may be configured to flow more liquid than the inlet pump 204. Such a design may be useful to prevent liquid from collecting in the reservoirs 104. In one version of such a design, the inlet pump 202 may be run less frequently than the outlet pump 220, thereby minimizing the opportunity for excess liquid to collect in the reservoirs 104.

Embodiment 200 illustrates a system with two pumps, one on the inlet size and one on the outlet side. In some embodiments, one of the pumps may not be present and gravity may be used. For example, the vessel 114 may be placed above the brewing device 102 and the inlet flow path may be gravity fed. In another example, the vessel 114 may be placed below the brewing device 102 and the outlet flow path may be gravity fed.

Embodiment 200 illustrates a system where the heating mechanism 204 and chilling mechanism 205 are located upstream from the reservoirs. Other embodiments may have one or both of the heating mechanism 204 and chilling mechanism 205 after the reservoirs 104 and prior to returning flow to the vessel 114.

The chilling mechanism 205 is illustrated as a separate device from the heating mechanism 204. Some embodiments may have a single mechanism that may be capable of actively heating and chilling the recirculating liquid.

Figure 3A:
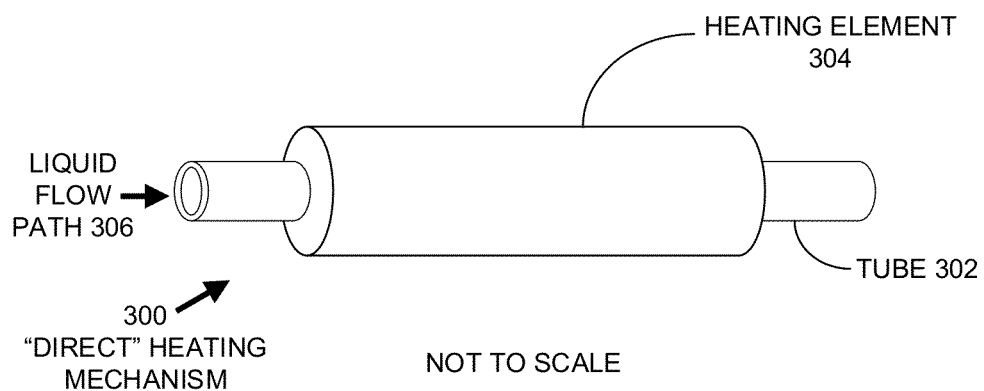
FIG. 3A is a diagram illustration of an embodiment showing a "direct" heating mechanism.

FIG. 3A is an example embodiment 300 showing a "direct" heating mechanism. FIG. 3A is not to scale.

Embodiment 300 may illustrate a tube 302 and a heating element 304. The liquid flow path 306 may cause liquid to flow through the tube 302, and the heating element 304 may apply "direct" heat to the tube 302. The heating element 304 may be an electrical element, gas flame, or other heat source.

Figure 3B:
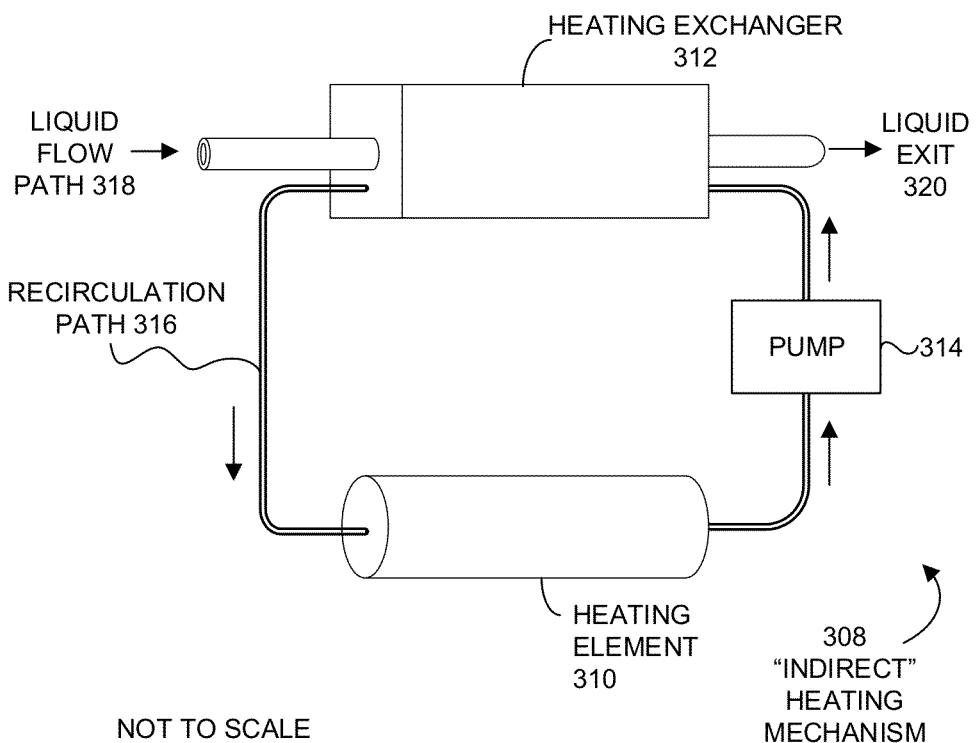
FIG. 3B is a diagram illustration of an embodiment showing an "indirect" heating mechanism.

FIG. 3B is an example embodiment 308 showing an "indirect" heating mechanism. FIG. 3B is not to scale.

Embodiment 308 may illustrate a heating element 310 and a heat exchanger 312. A pump 314 may cause a heat transfer liquid to flow along a recirculation path 316. A liquid flow path 318 may pass through the heat exchanger 312 and through an exit 320.

The term "indirect" heating mechanism is used to describe a heating mechanism where heat may be transferred to a recirculating liquid through a heat exchanges and a heat transfer liquid, as opposed to a "direct" heating mechanism where the heat may be applied without the intermediate heat transfer liquid.

Figure 4:
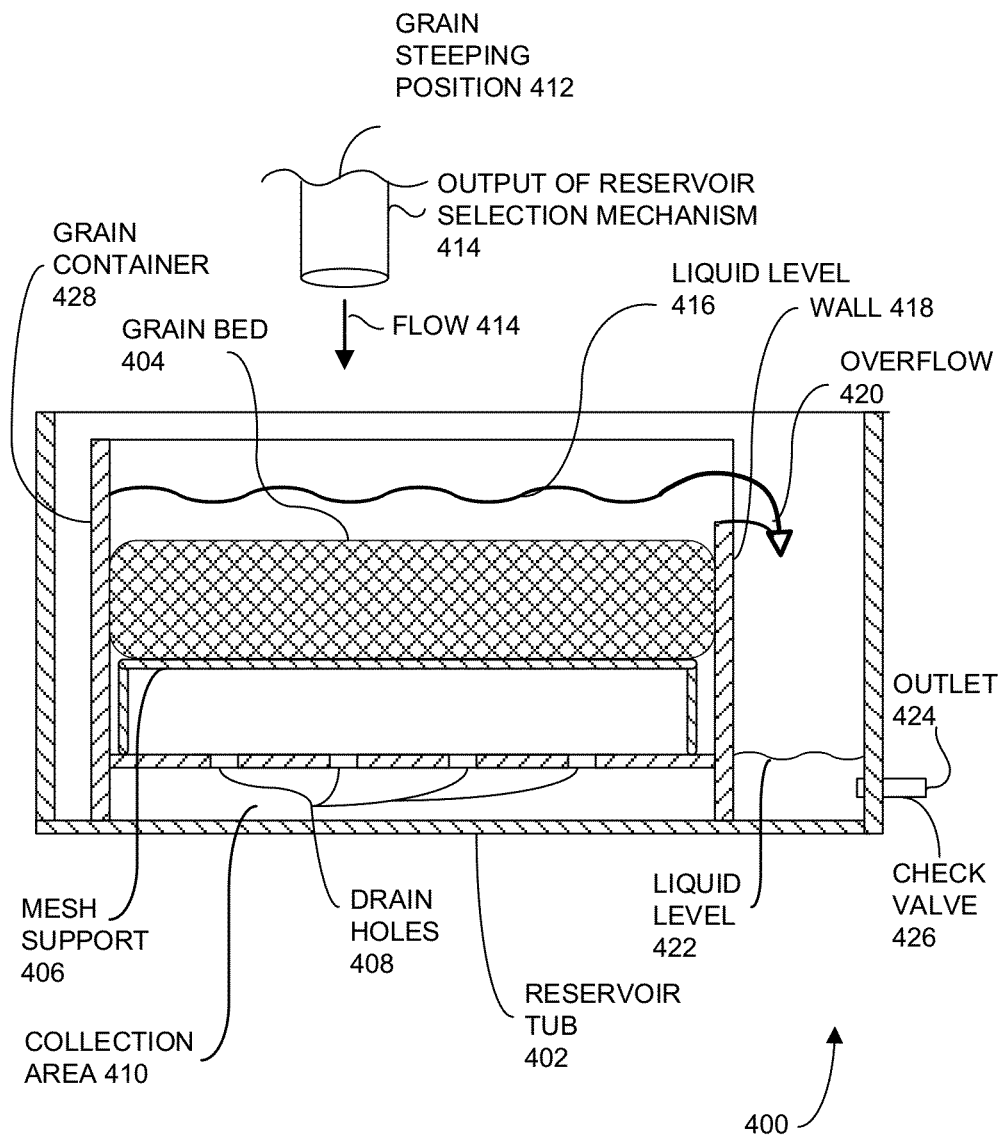
FIG. 4 is a diagram illustration of an embodiment showing a cross-section of a grain steeping reservoir.

FIG. 4 is an example embodiment 400 showing a grain steeping reservoir. FIG. 4 is not to scale.

Embodiment 400 illustrates one example design of a grain steeping reservoir where an overflow may be used to pass recirculated liquid through a grain bed 404.

The reservoir tub 402 may be a large container which may contain smaller containers. The smaller containers may be individually or collectively removable, or may be molded as one unit. In some cases, two or more containers may be joined together into a single unit, which may be removable from the reservoir tub 402.

A grain container 428 may have a grain bed 404 that may be supported by a mesh support 406. The mesh support 406 may retain the grain particles from leaving the container and possibly clogging downstream piping or equipment. Liquid in the grain bed 404 may pass through drain holes 408 into a collection area 410.

A reservoir selection mechanism may have an output 414 that may position an output at a grain steeping position 412. The flow 414 may drop recirculated liquid into the grain container 428.

The flow 414 may be higher than the amount of liquid that may pass through the drain holes 408, causing a liquid level 416 to exceed a wall 418 and causing an overflow 420. The overflow 420 may bypass the grain bed 404, and the grain bed 404 may remain wetted.

In some cases, the inlet pump may be controlled to fill the grain container 428 and maintain the liquid level 416 above the grain bed. Such a system may use a sensor to determine the liquid level 416, and may increase or decrease the flow 414 to maintain a minimum liquid level 416. Some such systems may or may not use an overflow system.

The overflow 420 may pass into an area that may be used for a bypass flow path. In a bypass flow path, the output of the reservoir selection mechanism 414 may be positioned over the overflow area such that the liquid may recirculate without passing through any of the various reservoirs.

The output of the drain holes 408 and the overflow 420 may collect in the bottom of the grain reservoir 402, creating a liquid level 422. The outlet 424 may draw the liquid out of the grain reservoir 402 and through a check valve 426.

Figure 5:
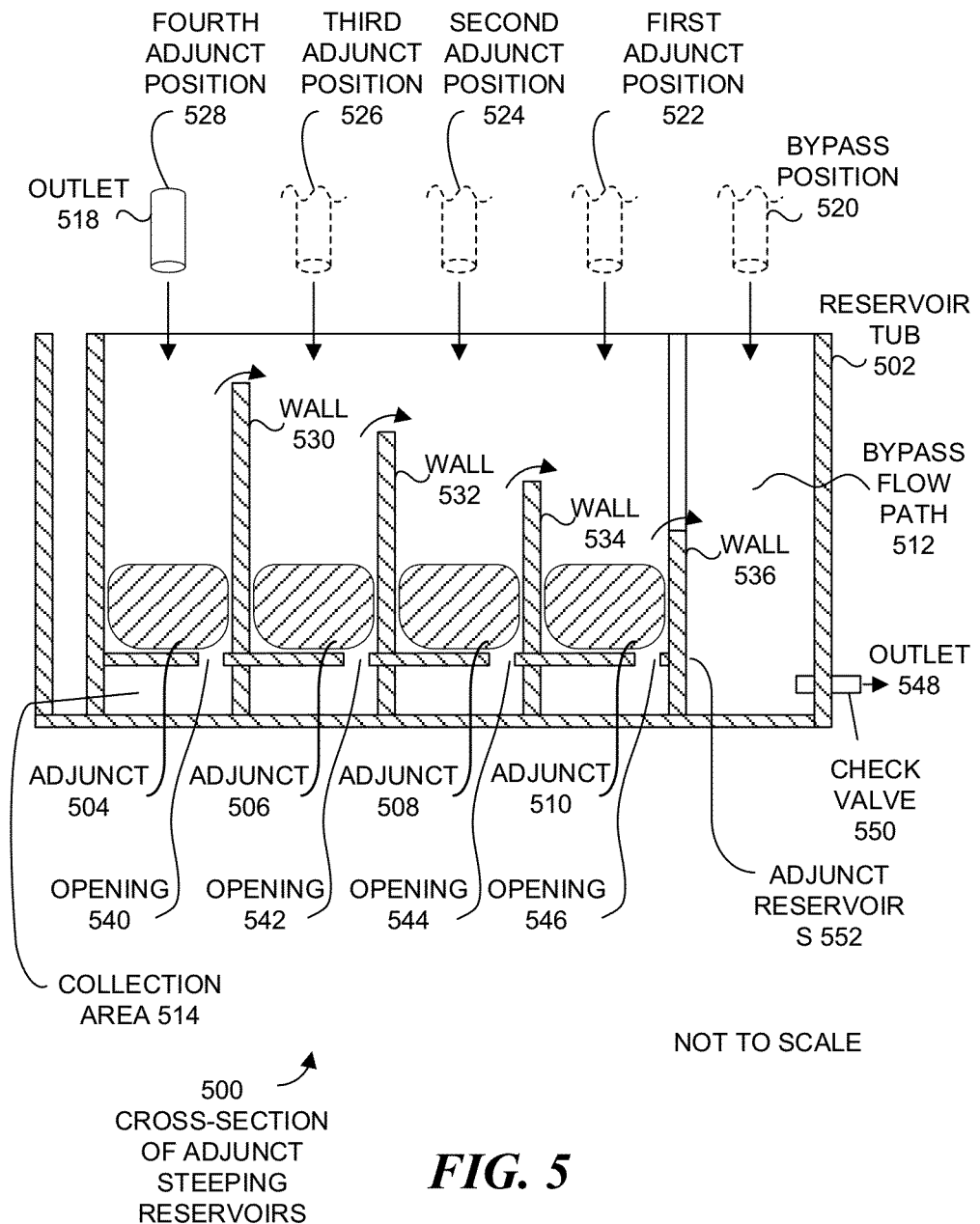
FIG. 5 is a diagram illustration of an embodiment showing a series of adjunct steeping reservoirs.

FIG. 5 is a diagram illustration of an embodiment 500 showing an example cross-section of a set of adjunct steeping reservoirs. FIG. 5 is not to scale.

FIG. 500 is merely one example of a cascading flow reservoir where multiple hops or adjuncts may be added to a flow path in a sequence.

The reservoir tub 502 may have reservoirs for adjuncts 504, 506, 508, and 510. Each of the reservoirs may have openings 540, 542, 544, and 546, respectively.

The reservoir tub 502 may be a larger container into which removable containers may be placed. The larger container of the reservoir tub 502 may be removable from a brewing device as a single unit, such that a user may load the reservoir tub 502 with the various ingredients into a brewing device. The reservoir tub 502 may contain multiple ingredient reservoirs, some of which may be removable from the reservoir tub 502 individually or joined to other ingredient reservoirs.

In the example of embodiment 500, the reservoir tub 502 may be one piece, which the adjunct reservoirs 552 may be a second, separate piece, which may be removable from the reservoir tub 502. In such an embodiment, the reservoir tub 502 may form a collection area 514 which may collect liquid as the liquid passes through one or more of the various reservoirs that may be in the reservoir tub 502.

A reservoir selection mechanism may be configured to move an outlet 518 into multiple positions over the reservoir 502. The positions may include a bypass position 520, a first adjunct position 522, a second adjunct position 524, a third adjunct position 526, and a forth adjunct position 528.

In the bypass position 520, liquid may flow through a bypass flow path 512 and through a check valve 550 to an outlet 548.

In the first adjunct position 522, flow may drop into the adjunct 510 and through an opening 546. When inlet flow exceeds the flow through the opening 546, an overflow may occur across the wall 536.

In the second adjunct position 524, flow may drop into the adjunct 508 and through an opening 544. The incoming flow may exceed the flow through the opening 544, causing an overflow across wall 534 and into the adjunct 510.

In the third adjunct position 526, flow may drop into the adjunct 506 and through an opening 542. The incoming flow may exceed the flow through the opening 544, causing an overflow across wall 532 and into the adjunct 508. When the incoming flow exceeds the flow through openings 542 and 544, the flow may overflow wall 534 and into the adjunct 510.

In the fourth adjunct position 528, flow may drop into the adjunct 504 and through an opening 540. The incoming flow may exceed the flow through the opening 540, causing an overflow across wall 530 and into the adjunct 506. When the incoming flow exceeds the flow through openings 540 and 542, the flow may overflow wall 532 and into the adjunct 508. When the incoming flow exceeds the flow through openings 540, 542, and 544, the flow may overflow wall 534 and into the adjunct 510.

The series of adjunct reservoirs and overflow walls may enable a process where adjuncts may be added to a cycle in sequence. For example, a first adjunct may be added into a boil sequence at the beginning. At a second point in the boil sequence, the outlet 518 may be moved to the second adjunct position 524. During this period, the second adjunct 508 may begin to be introduced to the liquid, yet the first adjunct 510 may continue to be steeped by the overflowing liquid.

Such a sequence may replicate a traditional boiling schedule where hops or other adjuncts may be added in sequence to a boil vessel. As the sequence continues, two additional charges of adjuncts may be added at later times.

Embodiment 500 illustrates an embodiment where four charges of adjuncts may be added to a recirculating system in sequence. Other systems may have more or fewer number of adjunct reservoirs that may be similarly configured.

Figure 6:
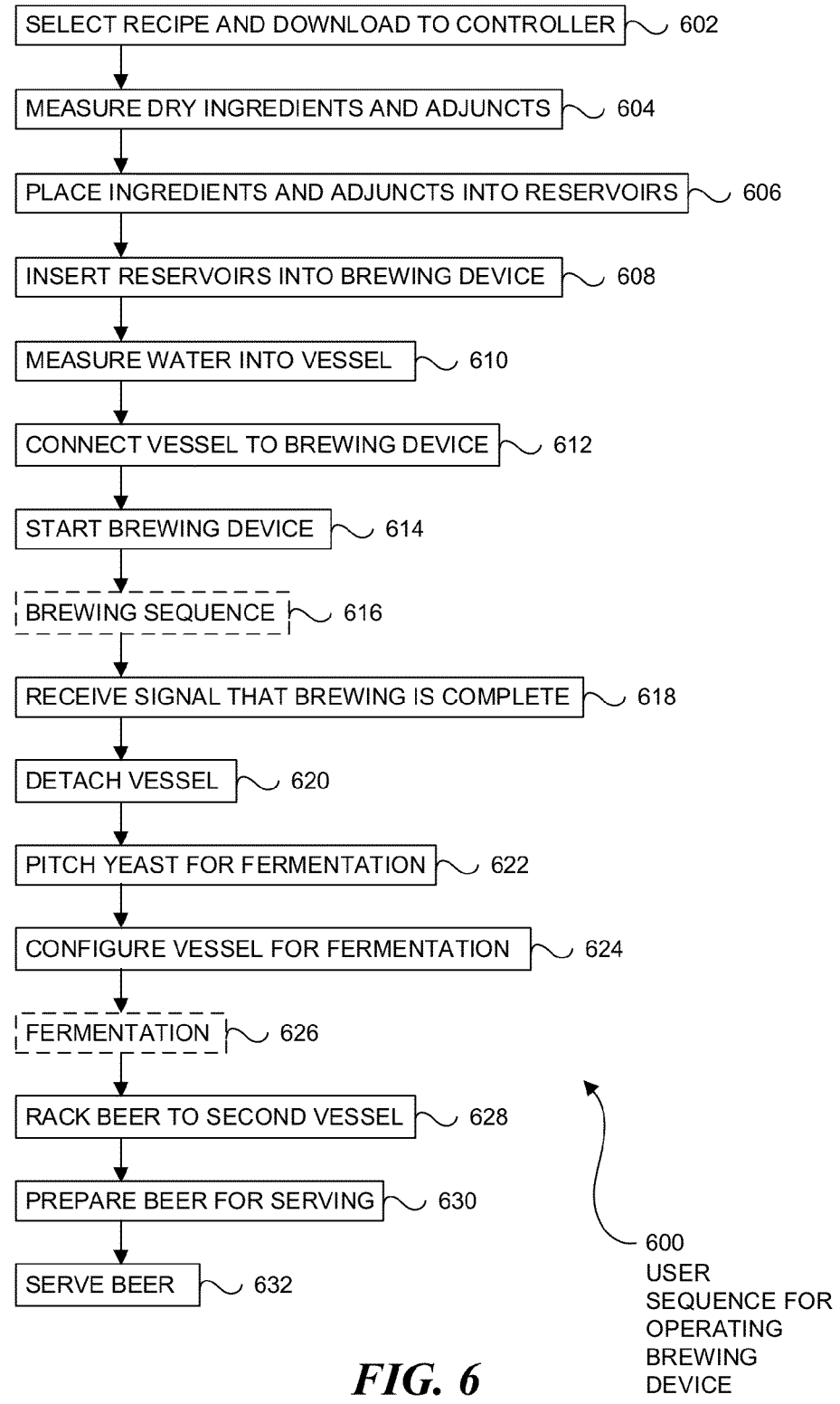
FIG. 6 is a flowchart illustration of an embodiment showing a method for user operations of the brewing device.

FIG. 6 is a flowchart illustration of an embodiment 600 showing a method performed by a user for operating an automated brewing device. Embodiment 600 may illustrate one method that may be performed with the device 102 of embodiment 100.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 600 may illustrate the basic steps that a user may perform when using an automated brewing system similar to that described in embodiments 100 or 200. The user may start by configuring the device with a recipe, load the brewing device, and start the device. The result of the device's operation may be wort that may be ready for fermentation, and after fermentation, the beer may be prepared for enjoyment.

A user may select a recipe and download the recipe to a controller on the brewing device in block 602. In some cases, the recipe may be downloaded from a server to the device over a network connection. In other cases, the user may manually program the device to perform a specific recipe.

The recipe may define the brewing sequence, which may include a mashing schedule and boiling schedule. The mashing schedule may define a time and temperature profile that may cause sugars to be extracted from grains that are being steeped. The boiling schedule may define a sequence of hops or other adjuncts and boiling times for which the adjuncts may be steeped.

The dry ingredients may be measured in block 604. The dry ingredients may include grains, such as malted barley, rice, corn, oats, or other grains and cereals that may be processed during a mashing phase, as well as different charges of hops or other adjuncts that may be added during a boil phase.

The ingredients may be added to various reservoirs in block 606 and inserted into the device in block 608.

Water may be measured and added to a vessel in block 610, and the vessel may be connected to the device in block 612.

The brewing device may be started in block 614, and the device may execute a brewing sequence in block 616. When the brewing sequence is complete, the user may receive a signal in block 618.

The user may detach the vessel in block 620, pitch yeast for fermentation in block 622, and configure the vessel for fermentation in block 624. The configuration may include adding an airlock to the vessel. The fermentation may occur in block 626.

Once fermentation is complete, the beer may be racked from one vessel to another in block 628. Racking may be performed to remove the beer from the yeast in many cases. The beer may be prepared for serving in block 630, which may involve bottling the beer or pressurizing a serving vessel with carbon dioxide or other gas for carbonation. Lastly, the beer may be enjoyed in block 632.

Figure 7:
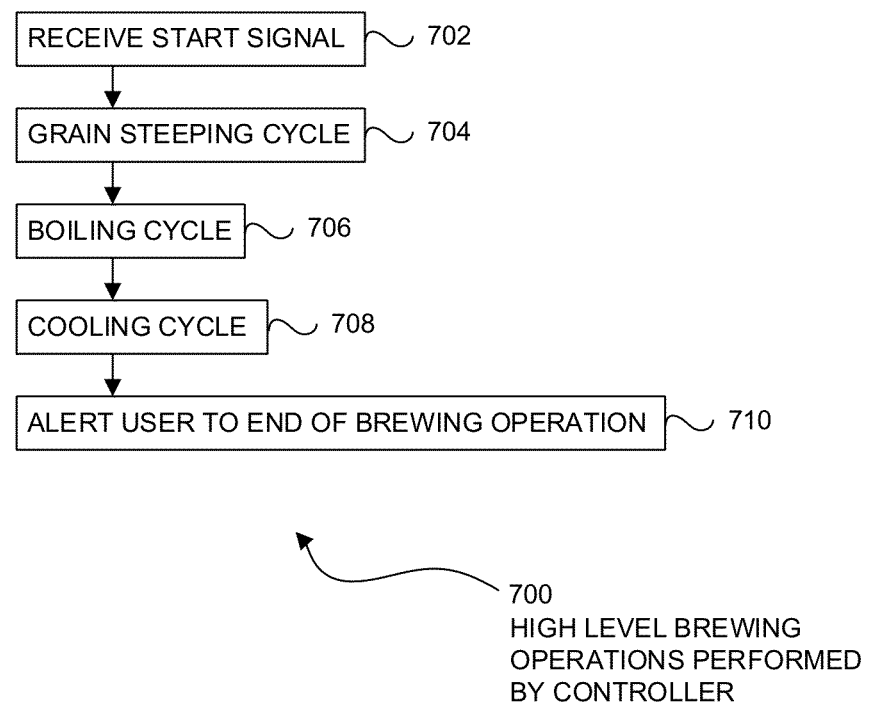
FIG. 7 is a flowchart illustration of an embodiment showing a method for operations of a brewing device.

FIG. 7 is a flowchart illustration of an embodiment 700 showing a high level method performed by a brewing device. The overall sequence may be presented in embodiment 700, and subsequent figures may describe these sequences in more detail.

The sequence of operations of a brewing device may follow a traditional wort manufacturing process. A start signal may be received in bloc 702. A grain steeping cycle or mashing cycle may be performed in block 704, followed by a boiling cycle in block 706, a cooling cycle in block 708, and the device may alert the user to the completion in block 710.

Figure 8:
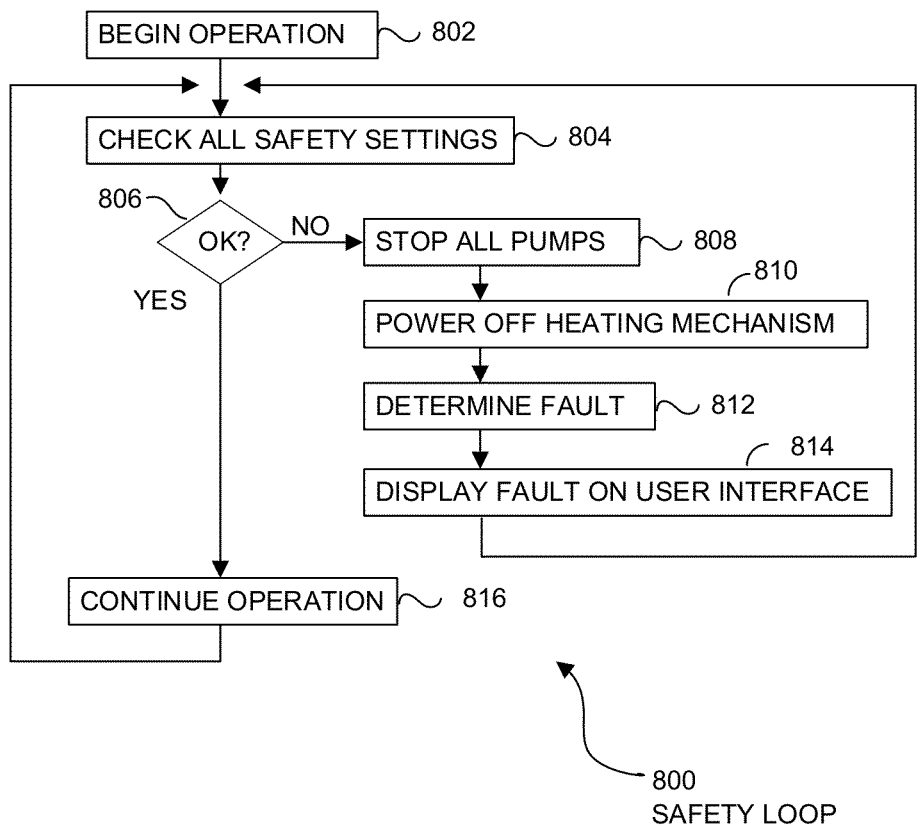
FIG. 8 is a flowchart illustration of an embodiment showing a safety loop operation of a brewing device.

FIG. 8 is a flowchart illustration of an embodiment 800 showing a safety loop that may be performed by a brewing device throughout the operational stages of brewing. Embodiment 800 may be a simplified version of a loop that may check safety settings and, if an error is detected, may halt operations.

Operations may begin in block 802.

All of the safety settings may be checked in block 804. If the safety settings are OK in block 806, the operations of the brewing system may continue in block 816.

The safety settings may vary from one embodiment to another. In general, the safety settings may be selected to reduce the risk of damage to users, the equipment, or to the wort being produced. Some systems may have inherent designs that may minimize scalding injuries, damage to the equipment, or other problems. In many cases, safety settings may be determined by sensors, switches, or other inputs.

When safety settings are not OK in block 806, all pumps may be stopped in block 808 and heating mechanisms may be powered off in block 810. Such operations may prevent scalding if hot liquids are present, or may prevent damage to the equipment.

A fault may be determined in block 812 and the fault may be displayed on an interface in block 814 to alert a user. The fault detection and display may be a fault that may be rectified by the user, such as repositioning a removable reservoir. In some cases, the fault may be a fault that may cause a brewing batch to be discarded, such as a fault in a heating mechanism.

The safety loop of embodiment 800 may be performed while the brewing device is in operation, including while the mashing cycle and boiling cycle are being performed.

Figure 9:
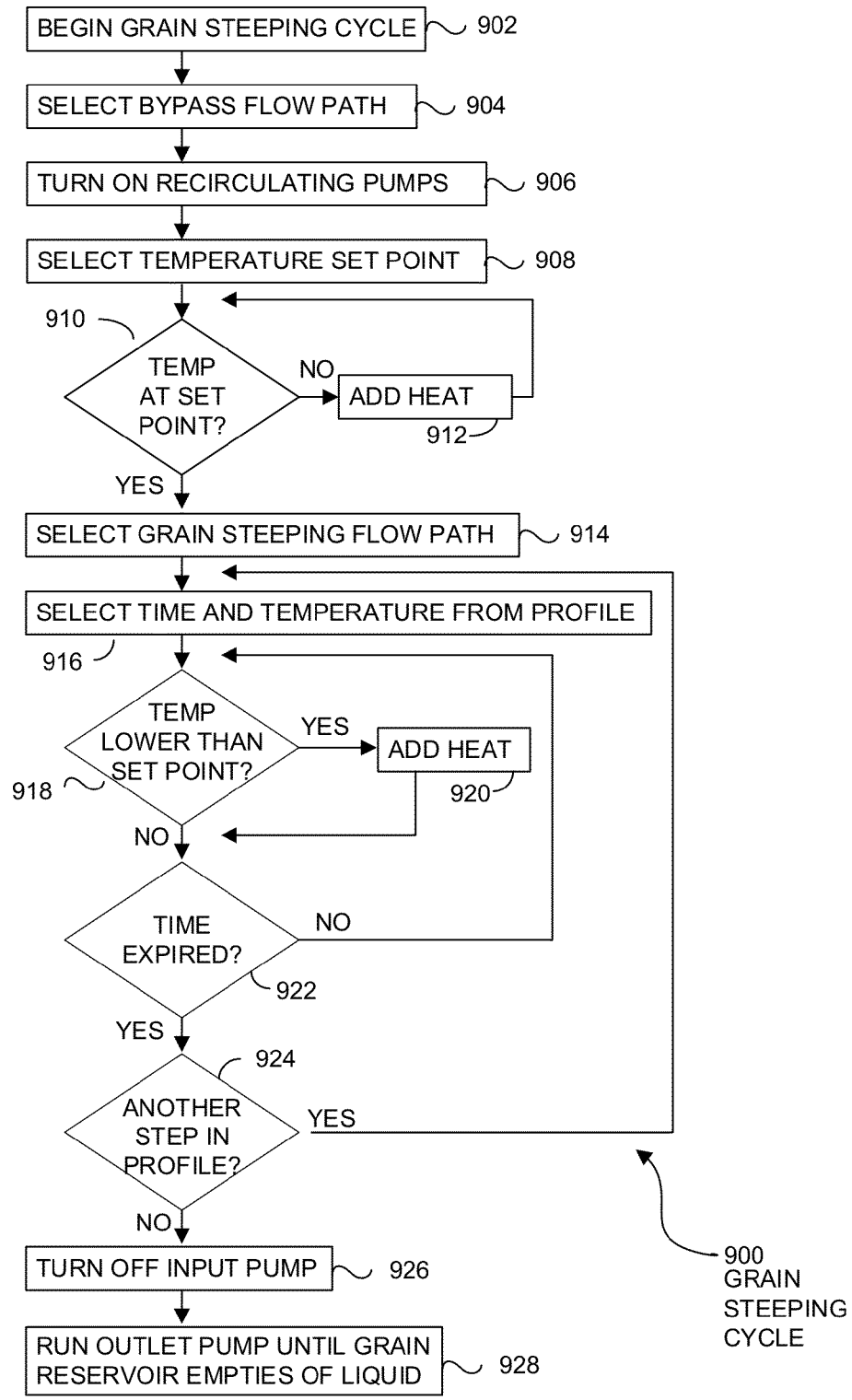
FIG. 9 is a flowchart illustration of an embodiment showing a method for a grain steeping cycle of an automated brewing device.

FIG. 9 is a flowchart illustration of an embodiment 900 showing a grain steeping cycle or mashing cycle. The mashing cycle may cause sugars to be extracted from a grain bed.

The mashing cycle may be defined by a time and temperature profile. A single-step infusion mash profile may have a first temperature set point which may be held for a period of time. In a typical sequence, the temperature may be in the range of 165 deg F and hold for 90 minutes. A more complex mashing sequence may start at one temperature, hold for a predetermined amount of time, move to a second temperature, hold for a second amount of time, and continue for several additional temperatures and time.

The mashing profile may be defined differently for different types of beers. Each mashing profile may cause different types of sugars to be extracted from the grains, and those sugars may affect the flavor profile of the finished beer.

The mashing profile may be part of the recipe that may be downloaded to a programmable controller in a brewing device. The programmable controller may turn on and off a heating mechanism to raise, lower, or maintain a temperature of the liquid, as well as control the various pumps and select bypass flow paths or one of the various reservoir flow paths during operations.

The grain steeping cycle may begin in block 902.

The bypass flow path may be selected in block 904. Recirculating pumps may be started in block 906 and a first temperature start point may be selected in block 908.

As the recirculating and heating may continue, if the temperature is not at a set point in block 910, heat may be added in block 912. Once the temperature reaches the set point in block 910, the grain steeping flow path may be selected in block 914. At this point, the mashing may begin as the grains become wetted.

A time and temperature may be determined from the mashing profile in block 914.

If the temperature is below the set point in block 918, heat is added in block 920. If the time has not expired in block 922, the process may return to block 918.

When the time has expired for the step in the mashing profile and another step remains in the profile in block 924, the process may return to block 916 to select the next time and temperature setting from the profile.

When all of the steps have been completed in block 924, the input pump may be turned off in block 926 and the outlet pump may continue to run in block 928 until the grain reservoir empties.

Figure 10:
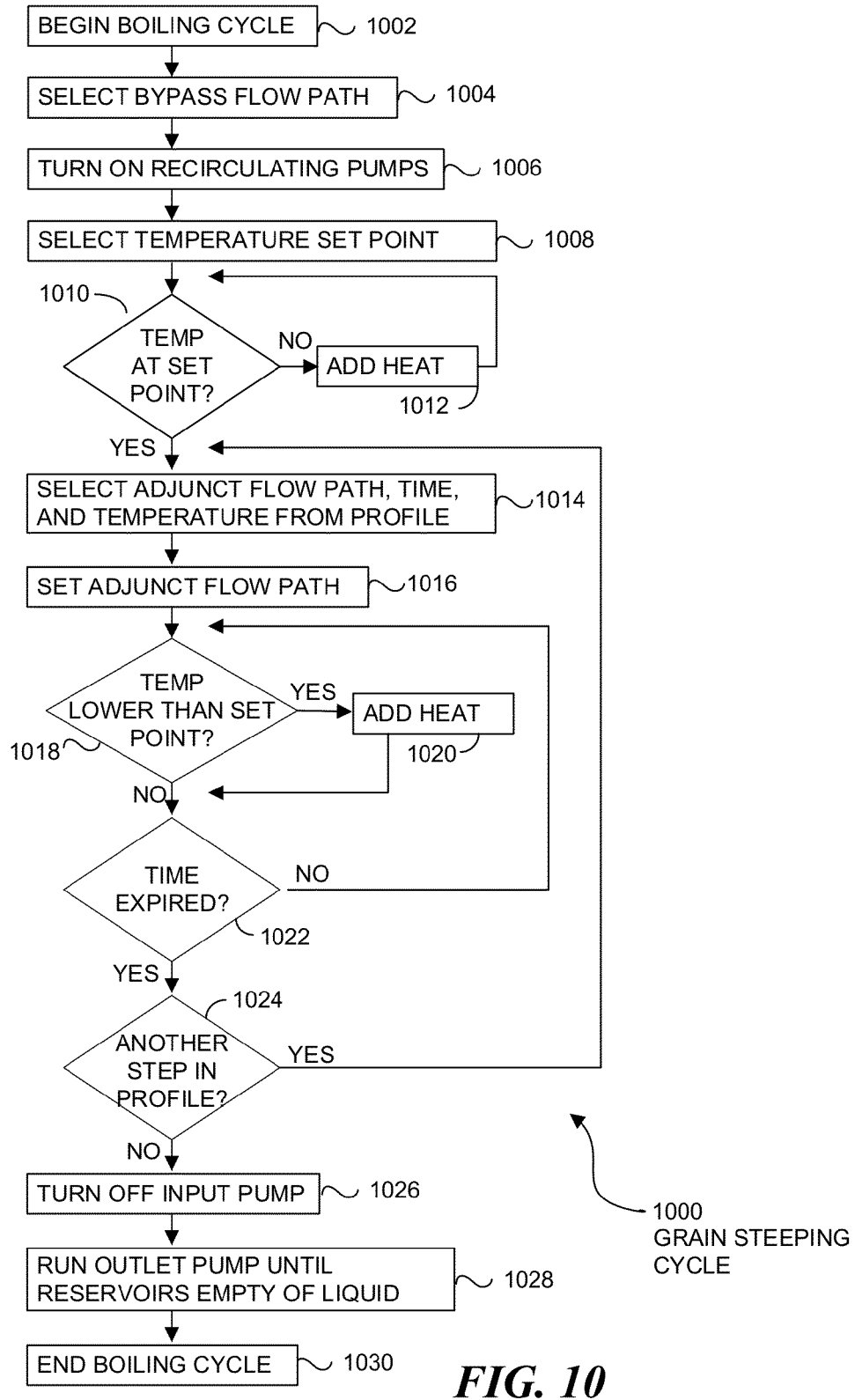
FIG. 10 is a flowchart illustration of an embodiment showing a method for a boiling cycle of an automated brewing device.

FIG. 10 is a flowchart illustration of an embodiment 1000 showing a boiling cycle. The boiling cycle may be performed at or near the boiling temperature and may further change the extracted sugars into fermentable sugars. During the boil cycle, hops and other adjuncts may be added in sequence.

The boiling cycle may be defined by a boiling profile, which may include definitions for an adjunct flow path, as well as time and temperature settings for each step in the boiling cycle.

The boiling cycle may begin in block 1002.

The bypass flow path may be selected in block 1004. The recirculating pumps may be turned on in block 1006 and a temperature set point may be determined in block 1008. In a typical boiling cycle, the first set point may be close to boiling, and may vary depending on altitude or atmospheric pressure. As the liquid recirculates, if the temperature is not at the set point in block 1010, heat may be added in block 1012.

Once the temperature reaches the set point in block 1010, the adjunct flow path, time, and temperature may be selected from the profile in block 1014.

The adjunct flow path may be set in block 1016. While liquid recirculates through the set adjunct flow path, if the temperature is lower than the set point in block 1018, heat may be added in block 1020. If time has not expired for the profile step, the process may return to block 1018.

Once time has expired on the boiling step and another step exists in the profile in block 1024, the process may return to block 1014 to determine and execute the next step in the profile.

If all the steps have been completed in block 1024, the input pump may be turned off in block 1026. The outlet pump may continue to run in block 1028 until the reservoirs empty. The boiling cycle may end in block 1030.

Figure 11:
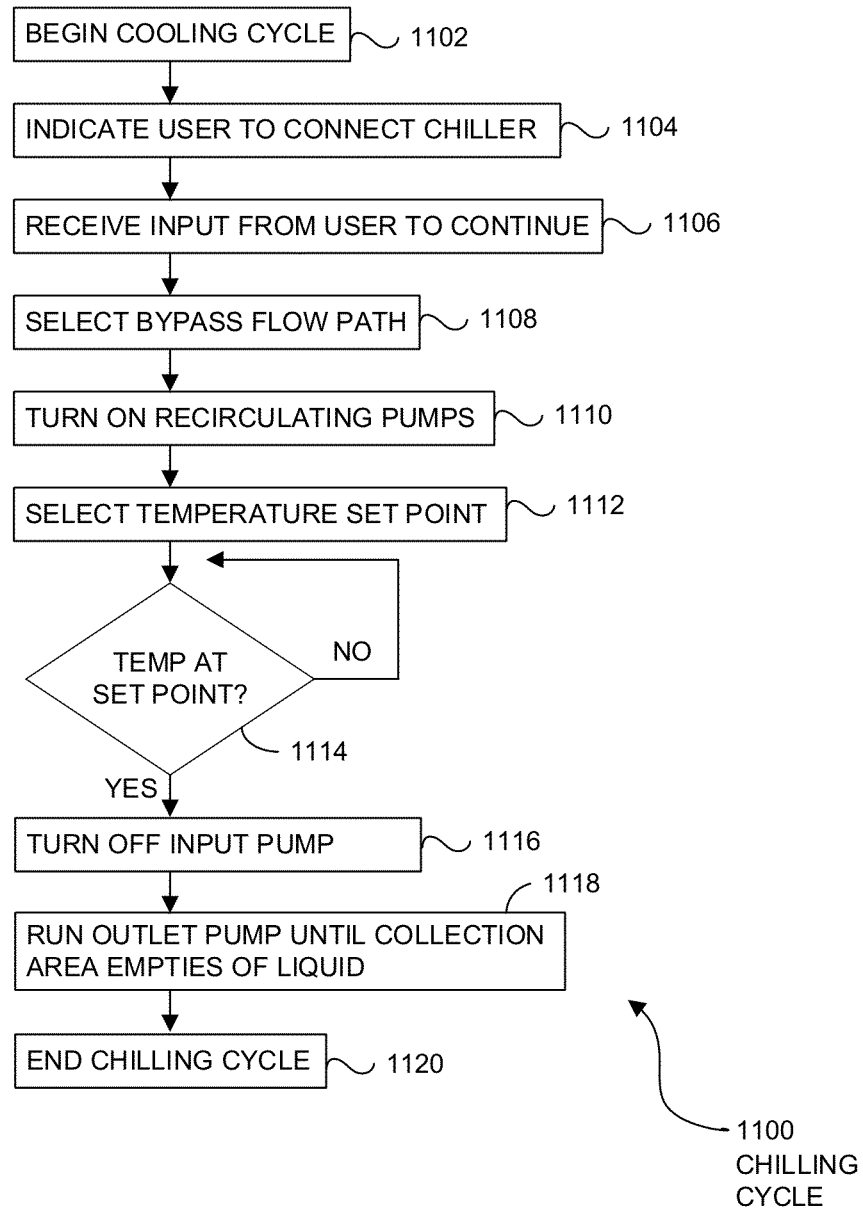
FIG. 11 is a flowchart illustration of an embodiment showing a method for a chilling cycle of an automated brewing device.

FIG. 11 is a flowchart illustration of an embodiment 1100 showing a chilling cycle. In embodiment 1100, the chilling cycle may use an external chiller that may be manually attached to the system.

Other systems may have internal chillers that may not have a user install the chiller.

The cooling cycle may begin in block 1102.

A user may be alerted in block 1104 to install a heat exchanger or other chilling mechanism. The user may send an input in block 1106 to the controller to continue once the chilling mechanism may be installed.

The bypass flow path may be set in block 1108. The recirculating pumps may be turned on in block 1110. A temperature set point may be selected in block 1112.

The recirculation may continue through the cooling mechanism. If the temperature is above the set point in block 1114, the recirculation may continue in block 1114.

Once the set point has been reached in block 1114, the input pump may be turned off in block 1116. The outlet pump may be run in block 1118 until the collection area empties. The chilling cycle ends in block 1120.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A brewing device comprising:
   an input connection to a liquid sump;
   an output connection to said liquid sump;
   a heat source;
   a first recirculating pump;
   at least two steeping reservoirs;
   a reservoir selecting mechanism connected to said at least two steeping reservoirs and having a programmable changing mechanism to switch liquid flow between said at least two steeping reservoirs;
   a piping system connecting said input connection, said first recirculating pump, said heat source, and said reservoir selecting mechanism, and said output connection to form a recirculating flow path;
   a programmable controller having a processor, said programmable controller connected to said heat source, said first recirculating pump, and said reservoir selecting mechanism.

2. The brewing device of claim 1, said programmable controller adapted to:
   receive a brewing sequence;
   execute a water heating sequence; and
   execute a mashing sequence using a first reservoir, said first reservoir being a grain mashing reservoir.

3. The brewing device of claim 2, said water heating sequence comprising recirculating water from said liquid sump and through said heat source.

4. The brewing device of claim 3, said mashing sequence comprising recirculating water from said liquid sump through said grain mashing reservoir.

5. The brewing device of claim 1, said programmable controller adapted to:
   receive a brewing sequence;
   execute a mashing sequence using a first reservoir, said first reservoir being a grain mashing reservoir; and
   execute a boiling sequence using a second reservoir, said second reservoir being a hops reservoir.

6. The brewing device of claim 5, said mashing sequence comprising recirculating water from said liquid sump through said grain mashing reservoir.

7. The brewing device of claim 6, said mashing sequence comprising recirculating water from said liquid sump through said hops reservoir.

8. The brewing device of claim 7 further comprising:
   a fermentation closure attachable to said liquid sump, said fermentation closure comprising an air lock.

9. The brewing device of claim 1 further comprising:
   a second recirculating pump;
   said piping system further connecting said second recirculating pump within said recirculating flow path.

10. The brewing device of claim 9, said second recirculating pump connected to an outflow of said at least two reservoirs.

11. The brewing device of claim 1, said heat source being a direct heat source.

12. The brewing device of claim 1, said heat source being an indirect heat source comprising a heat exchanger.

13. The brewing device of claim 1, said at least two steeping reservoirs comprising:
    a first steeping reservoir being a grain reservoir; and
    a second steeping reservoir being a hops reservoir.

14. The brewing device of claim 13 further comprising:
    a third steeping reservoir being a second hops reservoir, said third steeping reservoir being connected to said second steeping reservoir such that flow into said third steeping reservoir flows through said second steeping reservoir as part of said recirculating flow path.

15. The brewing device of claim 14 further comprising:
    a fourth steeping reservoir being a third hops reservoir, said fourth steeping reservoir being connected to said third steeping reservoir such that flow into said fourth steeping reservoir flows through said third steeping reservoir as part of said recirculating flow path.

* * * * *